United States Patent
Laulagnet et al.

(10) Patent No.: US 10,061,287 B2
(45) Date of Patent: Aug. 28, 2018

(54) APPARATUS, A SYSTEM AND A METHOD FOR MONITORING A USAGE OF AN ITEM

(71) Applicant: Vincent Laulagnet, Frederiksberg (DK)

(72) Inventors: Vincent Laulagnet, Frederiksberg (DK); Deogratius Musiige, Valby (DK)

(73) Assignee: Vincent Laulagnet, Frederiksberg (DK)

( * ) Notice: Subject to any disclaimer, the term of this patent is extended or adjusted under 35 U.S.C. 154(b) by 152 days.

(21) Appl. No.: 15/102,788

(22) PCT Filed: Dec. 9, 2014

(86) PCT No.: PCT/EP2014/077000
§ 371 (c)(1),
(2) Date: Jun. 8, 2016

(87) PCT Pub. No.: WO2015/086575
PCT Pub. Date: Jun. 18, 2015

(65) Prior Publication Data
US 2016/0334771 A1    Nov. 17, 2016

(30) Foreign Application Priority Data
Dec. 9, 2013 (EP) .................... 13196304

(51) Int. Cl.
*G05D 17/00* (2006.01)
*G05B 19/048* (2006.01)
*G06Q 10/06* (2012.01)

(52) U.S. Cl.
CPC .......... *G05B 19/048* (2013.01); *G06Q 10/06* (2013.01); *G05B 2219/24015* (2013.01); *G05B 2219/25281* (2013.01)

(58) Field of Classification Search
CPC ....................................................... G05B 15/02
USPC ................................................... 700/56, 286
See application file for complete search history.

(56) References Cited

U.S. PATENT DOCUMENTS

| | | |
|---|---|---|
| 2009/0216398 A1 | 8/2009 | Lynch |
| 2013/0040653 A1 | 2/2013 | Czompo et al. |
| 2014/0152464 A1* | 6/2014 | Smith .................... G08C 17/02 340/870.02 |
| 2015/0031330 A1 | 1/2015 | Zhou et al. |

\* cited by examiner

*Primary Examiner* — Michael J Brown
(74) *Attorney, Agent, or Firm* — Duane Morris LLP; J. Rodman Steele, Jr.; Gregory M. Lefkowitz

(57) ABSTRACT

This disclosure relates to an apparatus for monitoring a usage of an item. The usage characterises a physical handling of the item. The apparatus comprises a sensor configured to measure the usage of the item and to generate usage data based on the measured usage; a processing unit configured to determine based on the generated usage data a characteristic indicative of the usage of the item; and a wireless communication unit configured to transmit the determined characteristic indicative of the usage of the item and/or the generated usage data.

17 Claims, 4 Drawing Sheets

APPARATUS, A SYSTEM AND A METHOD FOR MONITORING A USAGE OF AN ITEM

CROSS-REFERENCE TO RELATED APPLICATIONS

This application is a § 371 national stage entry of International Application No. PCT/EP2014/077000, filed Dec. 9, 2014, which claims priority to European Patent Application No. 13196304.3 filed Dec. 9, 2013, the entire contents of which is incorporated herein by reference.

TECHNICAL FIELD

The present disclosure relates to the field of Internet of things, and more specifically to an apparatus, a system and a method for monitoring a usage of an item.

BACKGROUND

Internet of things is a network of interconnected objects. The Internet of things provides a framework for examining physical objects and their activities. This provides valuable information about the people and environment interacting with those objects. This information can be processed into intelligence to improve the object and can also be used to trigger relevant actions. However, such information relating to usage is often not sufficiently precise or up-to-date, and is therefore hardly exploitable in further applications. Requirements in terms of precision and accuracy as well as freshness and timeliness are presently not sufficient. Another issue to consider is that monitoring data is often too subjective to be exploitable, which is the case e.g. for the currently widely used customer surveys.

Existing systems based on e.g. radio frequency identification (RFID) do not provide objective information on how an object is handled as RFID merely stores limited pre-set data, such as presence and an ID tag. Furthermore, most existing systems including RFID systems and camera analysis do not satisfy the mobility requirements of the object under test as these systems often suffer from a limited range of transmission or of gathering of the information as well as from a limited velocity under transmission. Objects tagged with RFID transmit within a range of a few meters while camera analysis is limited to the location of the camera.

Hence, the existing solutions are not well adapted for providing exploitable information on a usage of an object to further applications.

SUMMARY

It is an object of the present invention to overcome at least some of the disadvantages as mentioned above.

According to one aspect of the present disclosure, an apparatus for monitoring a usage of an item is provided, such as for remotely monitoring a usage of an item. The usage characterises a physical handling of the item. The apparatus comprises a sensor configured to measure the usage of the item and to generate usage data based on the measured usage; a processing unit configured to determine based on the generated usage data a characteristic indicative of the usage of the item; and a wireless communication unit configured to transmit the determined characteristic indicative of the usage of the item and/or the generated usage data.

The apparatus may monitor an activity involving a usage of an item.

The apparatus for monitoring an activity involving a usage of an item may provide significant advantage for characterizing and quantifying with accuracy usage of an item and for providing intelligence on the item itself.

In a second aspect, this disclosure relates to a collector system for monitoring a usage of an item, the usage characterising a physical handling of the item. The collector system comprises: an interface configured to receive a usage data and/or a characteristic indicative of the usage of the item; a collector processing unit configured to determine based on the received usage data and/or the received characteristic a feature indicative of the usage of the item; and a data storage unit configured to store the determined feature, the received usage data and the received characteristic. It is an advantage of the collector system that it may provide additional processing capability as well as reliability and availability of the usage data.

In a third aspect, this disclosure relates to a system for monitoring a usage of an item. The system comprises: an apparatus for monitoring a usage of an item described above; a collector system for monitoring a usage of an item as described above. The apparatus is configured to transmit the determined characteristic indicative of the usage of the item and/or the generated usage data to the collector system. The system combining the apparatus disclosed herein and the collector system provides a combination of embedded and remote processing which in turn may result in further improved accuracy of the derived feature and characteristic and in a minimized overall latency to access usage data derivatives.

In a fourth aspect, this disclosure relates to a method for monitoring a usage of an item, the usage characterising a physical handling of the item. The method comprises: measuring the usage of the item; generating usage data based on the measured usage; determining based on the generated usage data a characteristic indicative of the usage of the item; transmitting the determined characteristic indicative of the usage of the item and/or the generated usage data on a wireless communication channel. It is an advantage of the method disclosed herein that the method may provide a monitoring of usage of an item that may be efficient in terms of accuracy, timeliness and exploitation of the usage data.

Also disclosed is an apparatus for monitoring an activity involving a usage of an item. The usage may characterise a physical handling of the item. The apparatus comprises a first sensor configured to measure a first parameter related to a first condition affected by the usage of the item and to generate first usage data based on the measured first parameter. The apparatus comprises a second sensor configured to measure a second parameter related to a second condition and to generate second usage data based on the measured second parameter. The apparatus comprises a processing unit configured to determine based on the generated first and/or second usage data a characteristic indicative of the usage of the item. The apparatus may comprise a wireless communication unit configured to transmit the determined characteristic indicative of the usage of the item and/or the generated first and/or second usage data.

Also disclosed is a collector system for monitoring an activity involving a usage of an item. The usage may characterise a physical handling of the item. The collector system comprises an interface configured to receive usage data and/or a characteristic indicative of the usage of the item, a collector processing unit configured to determine based on the received usage data and/or the received characteristic a feature indicative of the usage of the item, and a data storage unit configured to store the determined feature, the received usage data and the received characteristic. The interface may be configured to receive usage data and/or characteristics from a plurality of items involved in one or more activities and/or from a plurality of users. The collector processing unit may be configured to determine a correlation between the feature indicative of the usage of the item and the received usage data and/or the received characteristic related to one or more activities performed formed by the user. The collector processing unit may be configured to identify a user, to identify the activity performed by the user, and to determine a correlation between the activity and the determined feature and/or a user capability.

In one or more embodiments, the feature indicative of the usage of the item comprises a score of an evaluation test performed by a user; and the processing unit is configured to determine a correlation between the score and the received usage data and/or the received characteristic.

Also disclosed herein is a method for monitoring an activity involving a usage of an item, the usage characterising a physical handling of the item. The method comprises measuring a first parameter related to a first condition affected by the usage of the item and a second parameter related to a second condition. The method comprises generating first usage data based on the measured first parameter and second usage data based on the measured second parameter. The method comprises determining based on the generated first and/or second usage data a characteristic indicative of the usage of the item. The method may comprise transmitting the determined characteristic indicative of the usage of the item and/or the generated first and/or second usage data on a wireless communication channel.

In one or more embodiments, measuring a first parameter related to a first condition affected by the usage of the item comprises measuring a position of the item, a movement of the item and/or a series of movements, and/or a force corresponding to the movement of the item, and/or a location of the item and/or a path of the item. Measuring a second parameter related to a second condition may comprise measuring one or more environmental parameters.

According to some aspects, determining based on the generated first and second usage data a characteristic indicative of the usage of the item may comprise:
   estimating a gravity vector in the multi-dimensional coordinate system based on the generated usage data;
   computing an acceleration vector of the item in the multi-dimensional coordinate system based on the generated usage data and the estimated gravity vector and/or;
   computing a velocity vector of the item in the multi-dimensional coordinate system based on the computed acceleration vector. Determining a characteristic indicative of the usage of the item based on the generated first and second usage data may additionally or alternatively comprise:
   determining a position vector of the item in the multi-dimensional coordinate system based on the computed velocity vector; and/or
   determining an orientation vector of the item in the multi-dimensional coordinate system based on the computed velocity vector and/or-correlating the measured environmental parameters with the estimated gravity vector, the computed acceleration vector, the computed velocity vector, the determined position vector, and/or the determined orientation vector and/or any combination thereof. The characteristic indicative of the usage of the item may be determined based on the correlating step.

In one or more embodiments, determining, based on the generated first and second usage data, a characteristic indicative of the usage of the item comprises obtaining a time stamp, generating a spatio-temporal map of the measured environmental parameters at the determined position vector, the estimated gravity vector, the computed acceleration vector, the computed velocity vector, and/or the determined orientation vector and any combination thereof. Obtaining a timestamp may comprise obtaining a timestamp of the measured parameter, such as an indicator of the time when the parameter is measured.

It is an advantage of the present disclosure that it enables obtaining information that is objectively representative of the usage of an object. Furthermore, the apparatus may be deployed on a large number of similar objects. Thus, it is an advantage that the apparatus according to the present disclosure may be non-invasive, easy and fast to deploy and do not impede the character of the object. For example, with or without the disclosed apparatus, the objects may be equally mobile and vehicular, and not limited to e.g. movements within a radius from an observer. It is an advantage that the monitoring may be performed with minimized deployment difficulty, full mobility, and faster response time. For example, the present disclosure may provide data processing and bandwidth that is more than 1000 times more efficient than a techniques based on video analysis.

It is an advantage of the present disclosure that at least some drawbacks of video-based monitoring system may be overcome and that an anonymous monitoring and an anonymous support of a user may be enabled, the user may for example be a user with special needs, such as a user trying to improve a skill, such as a user with a handicap (e.g. cerebral palsy).

It is an advantage of the present disclosure that the activity may be accurately detected for contextual analysis and handling. The granularity of the activity detection may be improved with two or more sensors comprised in the apparatus disclosed herein. The present disclosure enables the monitoring of fine motoric activities, such as playing puzzle or painting, with high precision.

The present disclosure may allow combining data from two or more sensors to assess quality of a performed activity. A combination of two or more sensors may be desired in order to assess whether a complex daily life activity is executed correctly, e.g. as expected. Combining for example, a spatial sensor, such as a motion sensor, with an environmental sensor to measure parameters such as light and/or noise stimuli, such as stress and/or physical energy levels may allow providing an impact of a quantitative influencing factor on a qualitative evaluation.

Furthermore, the present disclosure may enable a possibility to recreate, visualize, and/or experience in e.g. an animation, conditions, such as pressure, sound and/or light conditions that were present during the monitored activity. The proposed technique may provide the advantage of associating a movement or a series of movements with an environmental condition. This may be advantageous for training an activity pattern recognition and may reduce development time and cost of the proposed technique.

The present disclosure may permit analysing an influence of an activity or a treatment on a capacity or a skill based on data measured by two or more sensors. The proposed technique may provide improved granularity and precision of a monitoring of an activity, such as a detection and/or an evaluation of the activity. Thereby the proposed technique may improve an assessment regarding how an activity influences a capacity or a skill of a user. This may provide a major gain in time and cost in e.g. clinical trials of different therapeutic activities or treatments.

The sensor may comprise one or more sensors configured to measure a handling or a usage of the item, such as a sensor configured to measure a movement and/or a series of movements; and/or a sensor configured to measure a position and/or an orientation; and/or a sensor configured to measure a location and/or a path. The one or more sensors may detect a parameter that changes when an item is used or acted upon, such as light, motion, temperature, magnetic field, gravity, humidity, moisture, vibration, pressure, electrical field, sound, and other parameters related to the physical handling of the item.

The sensor, including e.g. a first and/or second sensor, may be any sensor capable of detecting a handling or usage of the item, such as an accelerometer, a gyroscope, a transducer, etc. In some embodiments, one or more of the sensors, such as the accelerometer, may be based on piezoelectric technology which is lightweight thus providing the apparatus as disclosed herein with optimal portability and reduced size.

In one or more embodiments, the one or more sensors may comprise a sensor configured to measure a movement and/or a series of movements; and/or a sensor configured to measure a position and/or an orientation; and/or a sensor configured to measure a location and/or a path; and/or an accelerometer; and/or a gyroscope; and/or a transducer; and/or a sensor configured to measure light parameters; and/or a sensor configured to measure temperature; and/or a sensor configured to measure pressure; and/or a sensor configured to measure a sound; and/or a sensor configured to measure a physiological property of a user.

In one or more embodiments, a first sensor may be configured to provide first usage data and a second sensor may be configured to provide second usage data, etc.

In one or more embodiments, the first usage data and/or the second usage data comprises a sequence of positions of the item, a sequence of geographic locations of the item, a sequence of orientations of the item, a force, a velocity of the item, and/or an acceleration of the item, a sequence of light parameter measurements, a sequence of temperature measurements, a sequence of pressure measurements, a sequence of sound measurements.

The processing unit and the wireless communication unit may be integrated in a wireless modem. A wireless modem has a relatively large processing capability (compared to a sensor) to process usage data and advanced transmission means to send usage data with relatively short latency. Hereby, the apparatus for monitoring a usage of an item may exploit the processing capability and the transmission means of the wireless modem. The apparatus achieves thus improved accuracy and precision of the usage data as well as improved timeliness of the usage data. The apparatus as disclosed herein provides a real time processing of the usage data with minimal efforts in terms of deployment and setup.

In this disclosure, the term "wireless communication unit" refers to any wireless communication unit, such as any wireless mobile communication unit, capable of communicating with a wireless network. The wireless network may be a wireless network that covers a broad area. The wireless network may support vehicular communications. The wireless network may be any telecommunications network that links across metropolitan, regional, or national boundaries. Examples of wireless networks include a cellular system, a wireless metropolitan area network, a wireless local area network or any combination thereof. Depending on the wireless technology, the apparatus may achieve a large bandwidth, a low latency and a low energy per bit.

The wireless communication unit may be configured to operate in a cellular system. The processing unit and the wireless communication unit may be integrated in a cellular modem. A cellular system is a wireless communication system with wide coverage and supporting mobility ranging from pedestrian to vehicular. A cellular system may also refer to a mobile network. A cellular system may be any mobile communication standard, such as any $4^{th}$ generation standards, such as any mobile communication standard developed within $3^{rd}$ generation partnership project, 3GPP, such as GSM, GPRS, EDGE, UMTS, CDMA2000, HSDPA, LTE, LTE-Advanced, etc. The wireless communication unit may also operate in wireless metropolitan area network such as WiMAX or HIPERMAN. The apparatus and method for monitoring a usage of an item enable a real time analysis of the usage while maintaining the item mobile even when the apparatus is tagged on the item.

The usage data may comprise a sequence of positions of the item, a sequence of geographic locations of the item, a sequence of orientations of the item, a force, a velocity of the item and/or an acceleration of the item. The usage data generated by the sensor may not be directly exploitable by an information collector and may therefore need further processing at the processing unit. For example, an acceleration generated by an accelerometer may not be exploitable as such in further applications unless it is processed to compensate for e.g. the gravity.

In one or more embodiments, the processing unit may be configured to be activated by a signal received from the sensor. The wireless communication unit may be configured to be activated by a signal received from the processing unit. The apparatus as disclosed herein experiences reduced power consumption. It is particularly advantageous to increase the battery life of the apparatus for monitoring a usage of an item that is not plugged to an electrical charging station. It is envisaged that the apparatus and method for monitoring a usage of an item may be widely deployed on a large scale, which emphasizes on the minimization of power consumption even more.

In one or more embodiments, the apparatus further comprises a controller configured to trigger an operation based on the generated usage data and/or the determined characteristic indicative of the usage of the item. The operation triggered by the controller may be performed upon the item under monitoring or upon an additional item. The operation may be an action such as sending an SMS or email, turning on/off lights, operating a machine or a robot, updating a database, controlling connected objects such as consumer electronics, etc.

The wireless communication unit may be configured to send usage information to a user, the usage information comprising the generated usage data and/or the determined characteristic indicative of the usage of the item. The usage information may be sent in form of an SMS or an email or a report directly from the apparatus for monitoring usage of an item.

The collector system may be a cloud-based collector system and may thereby reduce both the deployment time and cost of specific applications. A cloud involves a large number of computers connected through a real-time communication network such as the Internet. The collector system may thus use a distributed computing network.

Furthermore, the collector system may be further configured to provide to a user an output indicative of the usage of the item. The collector system may provide access to analysis and visualisation of the characteristics and features derived from the usage data with a relatively short latency.

In one or more embodiments, the collector system may further comprise a controller configured to trigger an operation based on the determined feature. The controller may control the item under monitoring or may perform an operation upon the item or upon an additional item.

The apparatus may be configured to securely transmit data to the collector system. Transmitting data from the apparatus to the collector system may take place over a wireless channel. Securing the transmission comprises performing mutual authentication, achieving confidentiality of the data transmitted, protecting the integrity of the data to be transmitted, and achieving robustness against replay attacks. Moreover the data transmitted may be anonymized. This provides protection of personal data and privacy.

The method of the fourth aspect of this disclosure comprises: measuring the usage of the item. In a second step of the method, after obtaining a measurement related to the usage of the item, the method proceeds to providing usage data based on the measured usage. In a third step, the usage data is used to determine a characteristic indicative of the usage of the item. In a third step, the determined characteristic indicative of the usage of the item is transmitted on a wireless communication channel with or without the generated usage data.

The step of measuring the usage of the item may comprise measuring a position of the item, a movement of the item and/or a series of movements, and/or a force corresponding to the movement of the item, and/or a location of the item and/or a path of the item.

The step of generating usage data based on the measured usage may comprise: providing a multi-dimensional coordinate system; and determining multi-dimensional coordinates corresponding to the measured usage into the provided multi-dimensional coordinate system.

The step of determining based on the generated usage data a characteristic indicative of the usage of the item may comprise: estimating a gravity vector in the multi-dimensional coordinate system based on the generated usage data; and computing an acceleration vector of the item in the multidimensional coordinate system based on the generated usage data and the estimated gravity vector. The step of determining based on the generated usage data a characteristic indicative of the usage of the item may further comprise: computing a velocity vector of the item in the multi-dimensional coordinate system based on the computed acceleration vector; determining a position vector of the item in the multi-dimensional coordinate system based on the computed velocity vector; and/or determining an orientation vector of the item in the multi-dimensional coordinate system based on the computed velocity vector. Thereby, the characteristic indicative of the usage of the item may comprise the estimated gravity vector, the computed acceleration vector, the computed velocity vector, the determined position vector, and/or the determined orientation vector.

The multi-dimensional coordinate system may be a two-dimensional coordinate system or a three-dimensional coordinate system.

Monitoring usage of an item may further comprise triggering an operation based on the generated usage data and/or the determined characteristic indicative of the usage of the item.

A fifth aspect of this disclosure relates to an integrated-circuit card configured to perform the method as described above.

According to sixth aspect, this disclosure relates to a computer program, comprising computer readable code which, when run on a processing unit causes the apparatus to perform the method as described above.

The above and other features and advantages of the present invention will become more apparent to those of ordinary skill in the art by describing in detail exemplary embodiments thereof with reference to the attached drawings in which:

DETAILED DESCRIPTION OF THE DRAWINGS

Figure 1:
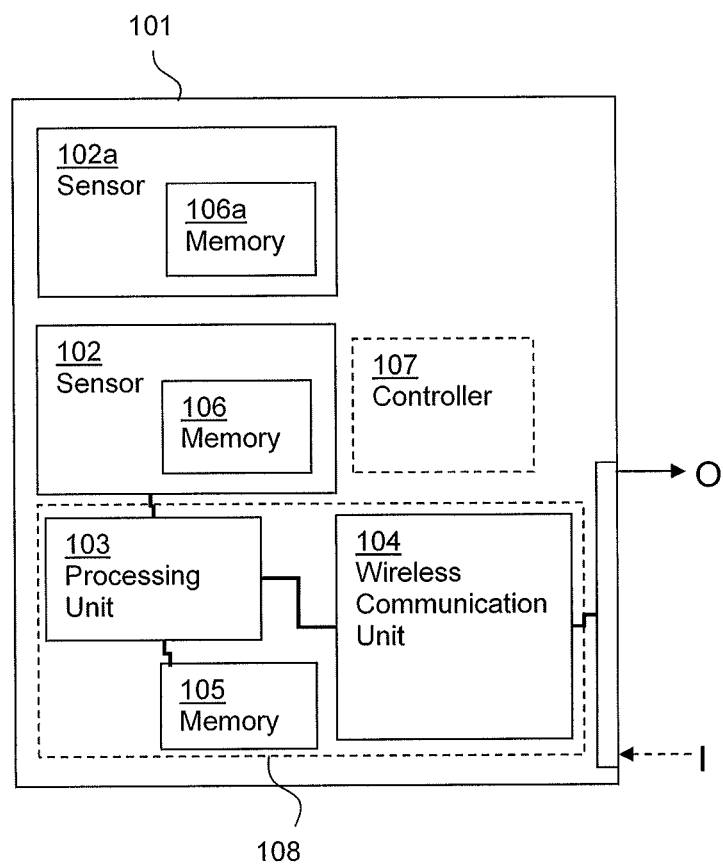
FIG. 1 illustrates an exemplary block diagram of an apparatus for monitoring a usage of an item according to the present disclosure.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the disclosure to those skilled in the art.

As used herein, the term "item" refers to a physical object, an article or a thing having material existence. In one or more embodiment, the term "item" here is not referring to a human being or an animal, or a part of a human being. The target of the monitoring is not a user of an item, but the item itself. Therefore, a user of the handheld device is not considered an item in this disclosure. The item may be an inert item or an inert thing. The item may be a retail item, a medication box, a medical device, an object carried by an individual, a building, a room. The medical device is e.g. prostheses, or special shoes. The object carried by an individual may be e.g. a watch, an arm slip, a bracelet, or a phone. The item may be part of a game system and may thus provide interactive input to the game system. The item may be a product under development such as a prototype. The item may be a product under test with an audience such as in a show-room. In one or more embodiments, the target of the monitoring is the user of the item.

As used herein, the term "usage" refers to the act, the manner, and the amount of a handling of an item. Usage refers also to the way an item is used or operated. Usage of an item may be characterized by a movement of the item, or a series of movements of the item. A movement may further be characterized by a force. Usage may also be characterized by a location or a path taken by the item. Usage may further be characterized by an action or operation as well as a series of actions or operations of the item. Usage may result in a change in a physical condition of an item, such as temperature, position, orientation, pressure, shape, form, content, volume, size, state, quantity, etc.

As used herein the term "sensor" refers to a device that measures or detects a condition and converts the condition into a representation which can be read by an observer. A condition to be detected by a sensor may involve e.g. light, motion, temperature, magnetic field, gravity, humidity, moisture, vibration, pressure, electrical field, sound, and other physical aspects. Thus, the sensor may be a motion sensor, an accelerometer, a gyroscope, a location sensor, such as a GPS sensor, an optical sensor, an optical arrangement comprising an optical emitter and/or an optical receiver, a magnetic field sensor, a thermometer, a humidity meter, a hygrometer, a barometer, a vibration sensor, a pressure sensor, touch sensor, an electric field sensor, a microphone, etc., or any combination thereof.

A sensor may be capable of detecting a movement, as e.g. a motion sensor or an accelerometer or a magnetometer. An accelerometer is a device that measures the force involved in the usage of an item. A magnetometer is a device used that measures the intensity and direction of a magnetic field.

A sensor may be capable of measuring orientation, based on the principles of angular momentum, such as e.g. a gyroscope. A sensor may be capable of detecting a change in temperature, such as e.g. a thermometer. A sensor may be capable of detecting a change in light, such as e.g. an optical sensor.

In one or more embodiments, the sensor includes one or more spatial sensors, such as a sensor capable of measuring spatial parameters, such as movement parameters, orientation parameters, localization parameters, etc.

In one or more embodiments, the sensor includes one or more environmental sensors, such as a sensor capable of measuring environmental parameters, such as temperature, light parameters, humidity parameters, pressure parameters, sound parameters, etc A sensor may comprise a transducer that is capable of detecting a parameter in one form and reporting it in another form of energy, such as an electrical signal.

In this disclosure, a sensor may combine any of the above capabilities.

As used herein the term "velocity" refers to a rate of change of the position of an item. Velocity comprises a speed and direction of motion, e.g. 30 km/h to the south. Velocity may be expressed as a vector physical quantity comprising magnitude and direction. The magnitude (i.e. the scalar absolute value of the vector) of the velocity is defined as speed, a quantity that is measured in metres per second (m/s) in the SI system.

As used herein the term "acceleration" refers to a rate at which the velocity of an item changes with time. Acceleration comprises a magnitude and a direction of motion. Acceleration may be expressed as a vector physical quantity. Acceleration may be expressed in metres per squared second (m/s$^2$). As used herein the term "force" refers to any influence that causes an item to undergo a certain change, either concerning its movement, direction, or geometrical construction. A force may cause an object with mass to change its velocity, i.e. to accelerate, or a flexible object to deform, or both. A force may be expressed in metres per second squared (m/s$^2$). A force may be derived from a product of a mass of an item with its acceleration.

FIG. 1 illustrates an exemplary block diagram of an apparatus 101 for monitoring a usage of an item, such as for monitoring an activity involving a usage of an item, according to the present disclosure. The apparatus 101 for monitoring a usage of an item comprises: a first sensor 102, a second sensor 102a, a processing unit 103, and a wireless communication unit 104. The apparatus 101 comprises a data storage 105. The sensor 102, 102a comprises a data storage 106, 106a. The data storage 105, 106 may be a memory. The memory can be any memory, such as a Random Access Memory, RAM, a Read and Write Memory, RWM, and a Read Only Memory, ROM, or any combination thereof. The memory may also comprise persistent storage, which, for example, can be any single one or combination of magnetic memory, optical memory, or solid state memory or even remotely mounted memory.

The processing unit may be any suitable Central Processing Unit, CPU, microcontroller, Digital Signal Processor, DSP, etc. capable of executing computer program code.

Sensor 102 comprises a sensor capable of measuring a movement and/or a series of movements. Sensor 102 may comprise a sensor configured to measure a position and/or an orientation. Sensor 102 may comprise a sensor configured to measure a location and/or a path. Sensor 102 includes one or more spatial sensors, such as a sensor capable of measuring spatial parameters, such as movement parameters, orientation parameters, localization parameters, etc.

Sensor 102 may comprise an accelerometer, a gyroscope, a transducer or a combination thereof. The force measured by an accelerometer may or may not be the coordinate acceleration (rate of change of velocity). The accelerometer may measure the acceleration associated with the phenomenon of weight experienced by any test mass at rest in the frame of reference of the accelerometer. For example, an accelerometer at rest on the surface of the earth measures an acceleration g=9.81 m/s$^2$ straight upwards, due to its weight. By contrast, accelerometers in free fall or at rest in outer space measures zero. The accelerometer may measure a g-force acceleration. The accelerometer may be a highly sensitive accelerometer with components of inertial navigation systems as in e.g. aircrafts and missiles. The accelerometer may be an accelerometer that is used to detect and monitor vibration in rotating machinery. The accelerometer may be an accelerometer such as that which is used in tablet computers and digital cameras so that images on screens are always displayed upright. The accelerometer may be a Single- or multi-axis model of accelerometer to detect magnitude and direction of the proper acceleration (or g-force), as a vector quantity, and be used to sense orientation (because direction of weight changes), coordinate acceleration (so long as it produces g-force or a change in g-force), vibration, shock, and falling in a resistive medium (a case where the proper acceleration changes, since it starts at zero, then increases). The accelerometer may be micromachined accelerometers to detect the position of the item or provide for input in a system such as a gaming system.

Sensor 102a includes one or more environmental sensors, such as a sensor capable of measuring environmental parameters, such as temperature, light parameters, humidity parameters, pressure parameters, sound parameters, etc Sensor 102a may include one or more physio-sensors to measure physiological parameters.

The apparatus 101 may comprise a third sensor, a fourth sensor etc.

Generating usage data involves sampling signals that measure real world physical conditions and converting the resulting samples into digital numeric values that can be manipulated by a processing unit.

Usage data generated by the sensor 102 comprises a sequence of positions of the item. A position is characterized by coordinates of the item in a referential or reference coordinate system (such as coordinate system 211).

Usage data generated by the sensor 102 comprises a sequence of geographic locations of the item. Geographic locations may be determined with respect to a reference coordinate system.

Usage data generated by the sensor 102 comprises a force. A force characterizes a movement, direction, or geometrical construction in a reference coordinate system.

Usage data generated by the sensor 102 comprises a sequence of orientations of the item, a velocity of the item and/or an acceleration of the item. Orientation characterizes an inclination, or a direction with respect to a previous position of the item 210 in a vector space. An orientation is expressed in terms of angles of rotation.

Usage data generated by the sensor 102a comprises a sequence of environmental parameters, and/or a sequence of physiological parameters.

Usage data comprises first usage data and/or second usage data.

The wireless communication unit 104 comprises a wireless interface to send data O and possibly receive data I. The wireless communication unit may be a cellular communication unit. The wireless communication unit may comprise a transmitter, or a receiver, or a transceiver. Data O to be sent is data related to usage, such as usage data or a characteristic indicative of the usage of the item. The received data I may be a feedback or an action upon item 210, a triggering of an action upon item 210, etc.

In one or more embodiments, the processing unit 103 and the wireless communication unit 104 are integrated in a wireless modem 108. A wireless modem is a device that modulates an analogue carrier signal to encode digital information, and also demodulates such a carrier signal to decode the transmitted information. A wireless modem comprises usually a processor, a baseband and a transceiver as well as a memory. A processing unit of a wireless modem may provide a finer granularity of the characteristics derived from usage data.

In one or more embodiments, the wireless communication unit operates in a cellular system. The cellular system is a mobile communication standard developed within $3^{rd}$ generation partnership project, 3GPP, such as GSM, GPRS, EDGE, UMTS, CDMA2000, HSDPA, LTE, LTE-Advanced. The wireless communication unit may also operate in wireless metropolitan area network such as WiMAX or HIPERMAN. If the apparatus 101 comprises a cellular modem, the cellular modem comprises a processing unit and a wireless communication unit. The apparatus 101 operating in a cellular system provides benefits in terms of wide mobility. Furthermore, the apparatus 101 operating in LTE benefits from an optimal latency to report the usage data, and from an optimal energy per transmitted bit of a transmission. The latency depends on the Discontinuous Reception, DRX and network configuration. A latency of 10-15 ms could be reached with optimal network configuration in LTE. The DRX configuration from 20 ms to 1280 ms may be advantageous for applications with different minimum latency requirements. For applications with relaxed latency requirements, the apparatus may shut down the wireless modem for longer periods of time. In LTE, at 50 Mbps transmission, the energy per transmitted bit may be around $5*10^{-9}$ Joule depending on the network configuration. A wireless modem in the apparatus 101 offers further improvement on the power consumption of the entire apparatus 101.

In some embodiments, the processing unit 103 is configured to be activated by a signal received from the sensor. The signal is an electronic alerting signal which may be an interrupt such as a hardware interrupt or a software interrupt. The interrupt may be a hardware interrupt when the sensor 102 is external to e.g. a device comprising the processing 103 unit, or an external peripheral of e.g. a device comprising processing unit 103. The interrupt may be a software interrupt when the sensor 102 is internal to a device comprising the processing 103.

The processing unit 103 is powered down initially. But also, when not having operations to process within a certain time window, the processing unit 103 enters in various power saving modes, such as light sleep mode or a deep sleep mode. These power saving modes save significantly on electrical consumption compared to leaving the processing unit fully on. These power saving modes save on processing latency by avoiding having to reissue instructions or to wait for a machine to reboot when resuming operations.

The interrupt causes the processing unit 103 to wake up from a power saving mode and resume its operational state in order to process data to be sent by the sensor 102, 102a.

In some embodiments, the wireless communication unit 104 may be configured to be activated by a signal received from the processing unit 103. The signal is an interrupt such as a hardware interrupt or a software interrupt. The wireless communication unit may be activated entirely or partly. When partly activated, the interrupt received from the processing unit 103 may trigger activation of only the baseband hardware and the transmitter of the wireless communication unit 104.

The power consumption of the apparatus 101 depends on the activity of the item monitored, latency requirement as well as network setting. For a use case with a low latency requirement and a usage reporting every hour, the power consumption of the apparatus 101 may be around 0.4-0.8 mW. For a use case with higher latency requirement and a DRX period of 1.28 s, the power consumption of the apparatus 101 may be around 6-8 mW.

The apparatus 101 comprising a sensor, such as a first sensor 102, and a second sensor 102a, a processing unit 103 and a wireless communication unit 104 results in a size of the apparatus 101 that is minimal. The apparatus may have a volume smaller than 10 cm$^3$, smaller than 1 cm$^3$, smaller than 0.5 cm$^3$, smaller than 0.3 cm$^3$, etc. In one specific embodiment, the size of the apparatus 101 may be e.g. 15 mm*10 mm*2 mm with an external sensor.

In one or more embodiments, the apparatus 101 further comprises a controller 107 configured to trigger an operation based on the generated usage data, e.g. the first and/or second usage data, and/or the determined characteristic indicative of the usage of the item. The controller 107 may control an automatic cleaning and/or an automatic organizing machine. The controller 107 may control a robot in a factory, or an industrial design machine. The controller 107 may turn on/off lights in a room. The controller 107 may also move items backed to a targeted location. The item movement and location is e.g. analyzed to automatically control a robot for example after a predefined usage to put back the items in e.g. a predefined position and/or orientation.

In one or more embodiments, apparatus 101 further comprises a wireless communication unit configured to send usage information to a user. The usage information comprises the generated usage data and/or the determined characteristic indicative of the usage of the item. The usage information may be sent in form of an SMS or an email or a report directly from the apparatus 101. The apparatus 101 may be provided in an integrated-circuit card.

Figure 2:
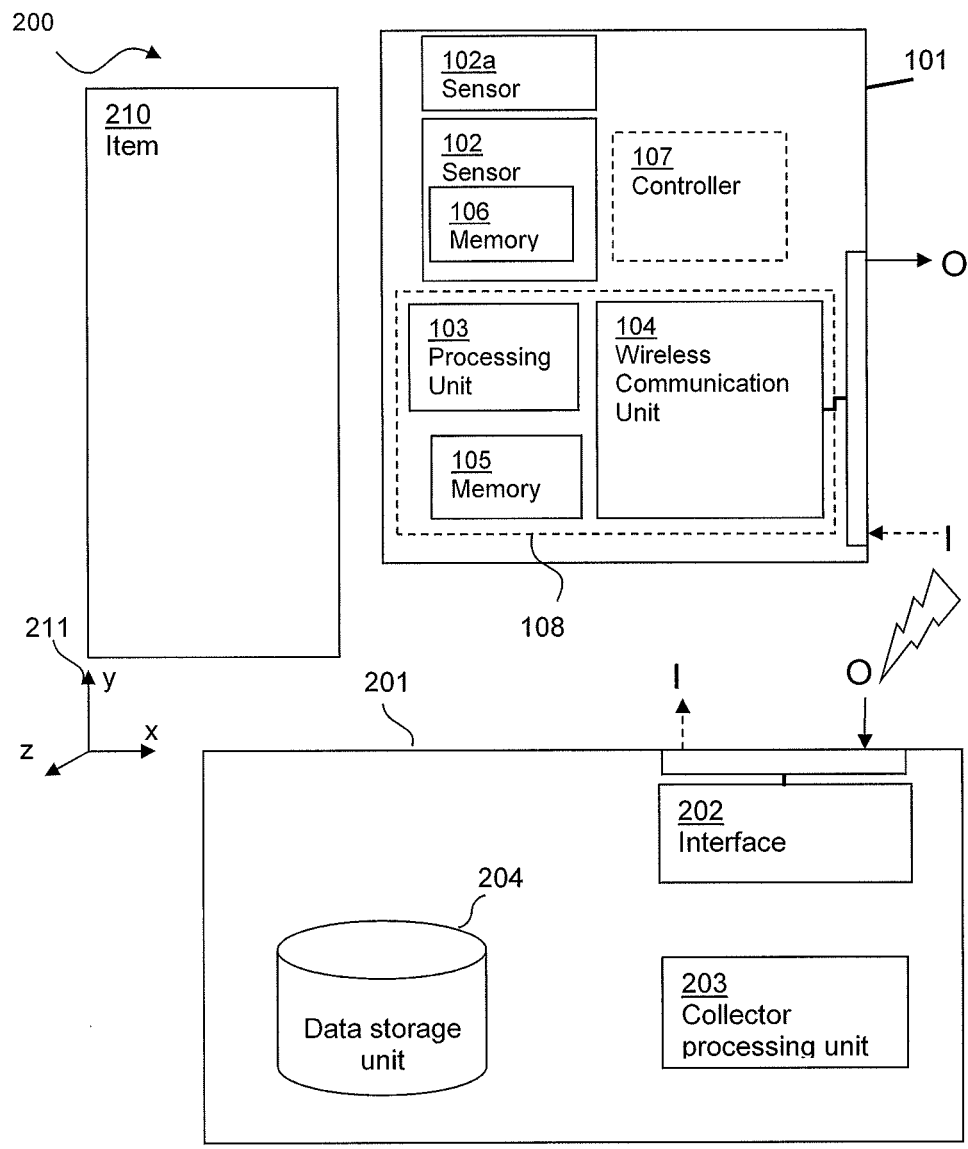
FIG. 2 illustrates an exemplary architecture comprising an item under monitoring, an exemplary apparatus for monitoring a usage of an item, and an exemplary collector system according to the present disclosure.

FIG. 2 illustrates an exemplary architecture 200 according to the present disclosure. FIG. 2 shows an item under monitoring 210, a system for monitoring a usage of item 210, e.g. for monitoring an activity, and a coordinate system 211. The system for monitoring a usage of item 210 comprises an apparatus 101 for monitoring a usage of an item, and a collector system 201. The system for monitoring a usage of an item provides unlimited access to the item under monitoring.

The collector system 201 for monitoring a usage of item 210 comprises an interface 202, a collector processing unit 203, and a data storage unit 204. The interface 202 is configured to receive a usage data and/or a characteristic indicative of the usage of the item 210. The collector processing unit 203 is configured to determine based on the received usage data and/or the received characteristic a feature indicative of the usage of the item 210. The feature indicative of the usage of the item 210 may be a further or additional characteristic indicative of the usage in e.g. coordinate system 211. The data storage unit 204 is configured to store the determined feature, the received usage data and the received characteristic.

In one or more embodiments, the collector system 201 further comprises a controller configured to trigger an operation based on the determined feature. The operation triggered may be upon item 210 or another item. The operation triggered may also be upon a machine.

The interface 202 is further configured to provide to a user an output indicative of the usage of the item. The output is for example an email, a report, or a visualization of the usage of item 210, such as a 3D animation or simulation.

The apparatus 101 transmits the determined characteristic indicative of the usage of the item 210 and/or the generated usage data to the collector system 201. The collector system 201 may also transmit the determined feature indicative of the usage of the item 210 to the apparatus 101.

In one or more embodiments, the apparatus 101 is configured to securely transmit data to the collector system 201. Secure transmission comprises mutual authentication, encryption, and integrity protection. The security protocol used for this purpose may be existing security protocols of the wireless system used by the wireless communication unit. For example, the security protocols involving IMSI, IMEI and IP Multimedia Services Identity Module, ISIM, in 3GPP cellular system as well as network operator security policies may be used to secure the transmission of usage data to the collector system.

The apparatus 101 is placed on item 210 that is to be monitored. In an initial setup phase, the apparatus 101 is successfully authenticated and granted access to the wireless network (e.g. using conventional 3GPP techniques). Then the apparatus 101 registers its International mobile Subscriber Identity, IMSI, or International Mobile Station Equipment Identity, IMEI, with the collector system. After registration, the sensor 102, the processing unit 103, and the wireless communication unit 104 are configured according to a targeted application (e.g. medical application, crowd control application, design application, test application), characteristics of the item under monitoring, and the network operator used. The configuration parameters include a detection threshold of the sensor 102, 102a, settings of the processing unit 103 (e.g. gravity vector estimation, speed vector estimation and relative position estimate), a targeted latency, a compression algorithm used, a network configuration targeted and a security level. The collector system is configured for providing an application-specific intelligence, a visualisation, a security level, and/or a set of actions. The sensors 102, 102a may be a spatial sensor and an environmental sensor, respectively. It is envisaged that even though only two sensors are illustrated any number of sensors may be provided to obtain any number of sequences of usage date.

The interface 202 may be configured to receive usage data and/or characteristics from a plurality of items involved in one or more activities and/or from a plurality of users. The collector processing unit 203 may be configured to determine a correlation between the feature indicative of the usage of the item and the received usage data and/or the received characteristic related to one or more activities performed by the user. The collector processing unit 203 may be configured to identify a user, to identify the activity performed by the user, and to determine a correlation between the activity and the determined feature and/or a user capability.

In one or more embodiments, the feature indicative of the usage of the item comprises a score of an evaluation test performed by a user; and the collector processing unit 203 is configured to determine a correlation between the score and the received usage data and/or the received characteristic.

In an illustrative example where the present technique is applicable, concentration of a user is evaluated based on evaluation test sequence including variable visual and audio stimuli or disturbances. Assessing concentration skills of a user allows determining an ability to adapt different learning environments. This can be measured precisely with the present technique by monitoring activities, such as an execution of a specific task in different environments with different disturbances. The activity performed by the user is monitored by the apparatus 101 when attached to the clothes or used items during an activity requiring a specific skill and/or at different difficulty levels (e.g. walking from A to B, making a puzzle, writing, playing games, etc.). The same activity is performed in different environmental conditions e.g. light and noise. The apparatus 101 monitors the activity, resulting in various parameters being measured by the first sensor and the second sensor. The apparatus 101 derives usage data e.g. activity duration and activity quality. The apparatus 101 determines based on the generated first and/or second usage data a characteristic such as a concentration ability defined by e.g. duration, difficulty and/or sensitivity to different types of disturbances for each specific type of activities. The collector apparatus 201 receives usage data and/or a characteristic indicative of the usage and determines a feature such as an optimal working environment and/or a support for each activity, e.g. for each learning solutions. The collector may output to e.g. educators a set of favourable environmental conditions, stimuli etc. which would allow educators to setup e.g. a special room and/or material for users (e.g. children) with specific concentration difficulties.

In an illustrative example where the present technique is applicable, a user is a child with a handicap that has special needs. The present disclosure provides a high-precision platform for training of a child with a handicap. The apparatus 101 allows evaluating precisely an ability of a child in one or more areas (e.g. memory skill, language skill, social skill, concentration, motor skill, executive skill). The apparatus 101 detects and monitors activities which can then be evaluated by the apparatus 101 and/or the collector system 201. The collector system 201 determines an impact of an activity on each area, e.g. using data stored in the data storage unit 204. The collector system 201 may then provide optimal training program with a set of improvement targets, chosen by the collector system 201 among a set of potential trainings.

Figure 3:
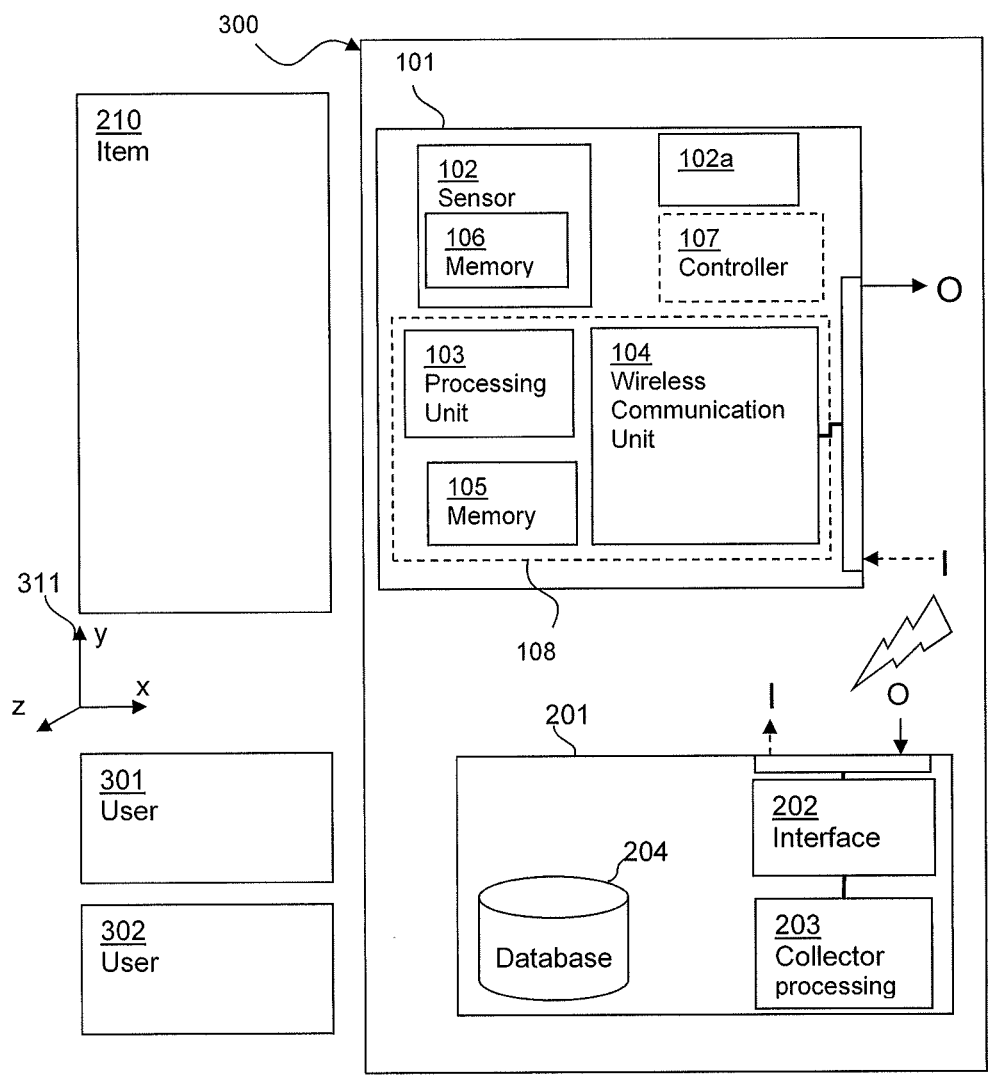
FIG. 3 illustrates an exemplary system for monitoring a usage of an item and two user of the system according to the present disclosure.

FIG. 3 illustrates an exemplary system 300 for monitoring a usage of an item 210 and two users 301 and 302 of the system 300. FIG. 3 shows a system 300 for monitoring a usage of item 210, such as for monitoring an activity involving a usage of an item. The system 300 comprises an apparatus 101 for monitoring a usage of an item, and a collector system 201. The users 301 and 302 utilize system 300 to monitor the usage of item 210. FIG. 3 shows a three dimensional coordinate system 311 used by the sensor 102, 102a to generate usage data based on the measured usage. The sensor 102 determines multi-dimensional coordinates corresponding to the measured usage into the provided multi-dimensional coordinate system. The sensor 102a provides e.g. environmental parameters measured at e.g. a spatial indicator, and/or a time indicator, thereby augmenting the spatial indicator with an additional information.

The multi-dimensional coordinate system may be a two-dimensional coordinate system or a three-dimensional coordinate system.

In an illustrative example of where the proposed technique is applicable, it is assumed that user 301 is a medical team and user 302 is a patient. The item 210 under test is a medication box. When the medication box is not used as expected, e.g. when there has been too many activities measured by the sensor 102, or likewise, when there has been less activity measured by the sensor 102, the apparatus 101 then reports the activity to the medical team. Reporting the activity to the medical team may involve triggering a call or an SMS or an email directly to users 301 and 302, i.e. the medical team and the patient. The apparatus contributes in improving the well-being and health of the patient as well as in providing a faster feedback from the patient to the medical team.

For example, if a target value for activity is set, the system may monitor whether the target value is reached, for example by determining whether the the activity measured is within a predefined interval for the target value, such as within e.g. +/−10% of the target value, such as +/−20% of the target value, etc. An alert may be provided if the target value is not within the predefined interval.

In an example where the impact of a new treatment or medication needs to be carefully tested in order to validate the effect of the treatment and medication as well as to ensure that the side effects are well understood and measured, the apparatus 101 and collector system 201 may measure parameters and/or collect usage data and enable accurate and fast assessments. The apparatus 101 and/or the collector system 201 determine with improved accuracy the actual effect of the medication and treatment on one or more areas simultaneously. The apparatus 101 and/or collector system 201 enable the separation of effects due to the activities performed and the environmental factors during the clinical trial and effects of the medication or treatment itself. The apparatus 101 and/or collector system 201 enable thus a measurement of a potential side effect on one or more areas.

Figure 4:
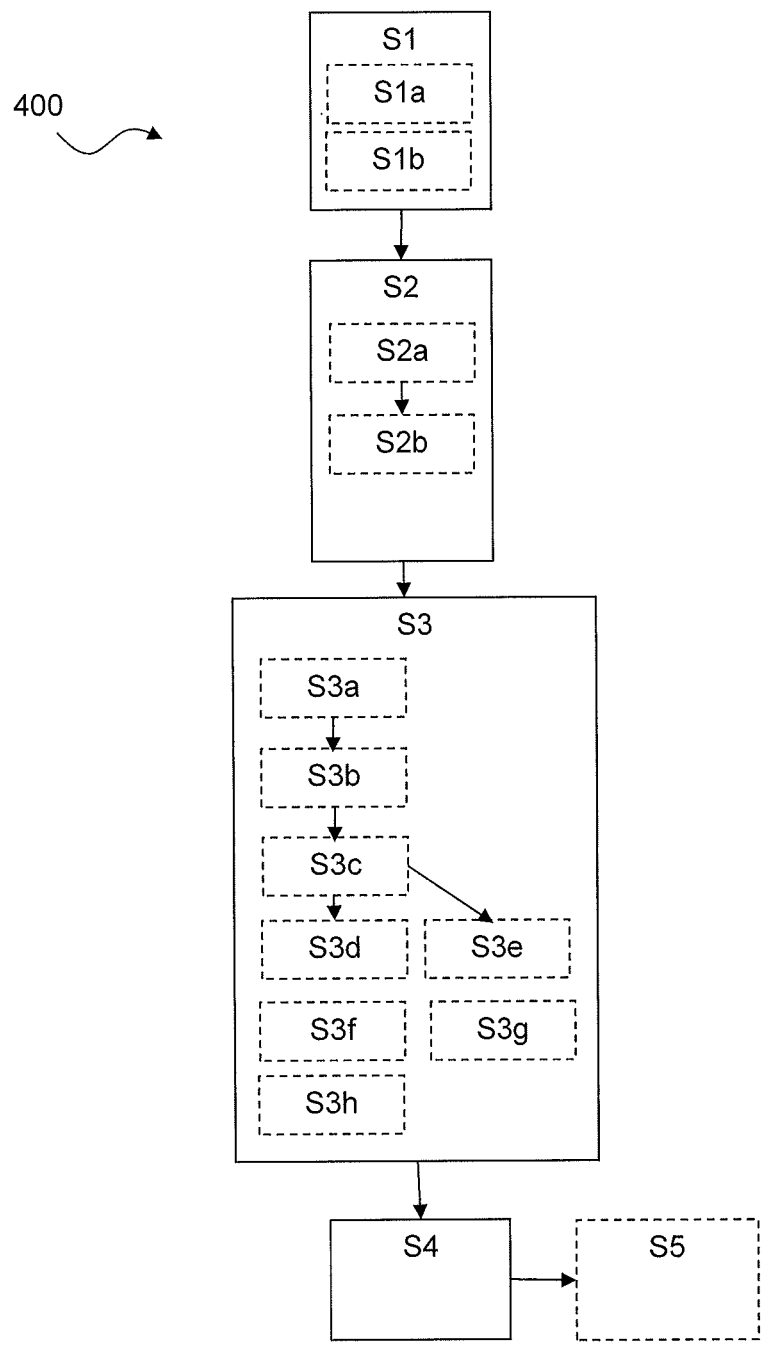
FIG. 4 is a flow-chart illustrating a method for monitoring a usage of an item according to the present disclosure.

FIG. 4 is a flow-chart illustrating a method 400 for monitoring a usage of an item 210 according to the present disclosure. The method 400 monitors a usage of an item, such as an activity involving the usage, the usage characterising a physical handling of the item.

A first step S1 of the method 400 involves the apparatus measuring the usage of the item, such as a first parameter related to a first condition affected by the usage of the item and a second parameter related to a second condition. In a second step S2, the apparatus generates usage data based on the measured usage. For example, the apparatus 101 generates first usage data based on the measured first parameter and second usage data based on the measured second usage parameter. In the next step S3, the apparatus 101 determines based on the generated usage data, such as first and/or second usage data, a characteristic indicative of the usage of the item. In step S4, the apparatus 101 transmits the determined characteristic indicative of the usage of the item and/or the generated usage data on a wireless communication channel. The method is performed by an apparatus for monitoring a usage of an item, such as for monitoring an activity.

According to one embodiment of the proposed technique, the step S1 of measuring the usage of the item, i.e. measuring a first parameter related to a first condition affected by the usage comprises measuring S1a a position of the item, a movement of the item and/or a series of movements, and/or a force corresponding to the movement of the item, and/or a location of the item and/or a path of the item. When measuring movements or positions, the sensor measures e.g. both the physical acceleration and the contribution of normal forces that prevent the item from falling toward the centre of the Earth.

Alternatively or additionally, measuring S1 a second parameter related to a second condition comprises measuring S1b one or more environmental parameters.

According to another embodiment of the proposed technique, step S2 of generating usage data comprises: providing S2a a multi-dimensional coordinate system; and determining S2b multi-dimensional coordinates corresponding to the measured usage into the provided multi-dimensional coordinate system. In an illustrative example of where the proposed technique is applicable, it is assumed that the sensor 102 of the apparatus 101 is an accelerometer. The accelerometer measurement vector $a_m$ in the coordinate system 211, 311 can be expressed as follows:

$$a_m = a_B - R_I^B \begin{pmatrix} 0 \\ 0 \\ g \end{pmatrix} \quad (1)$$

where $a_B$ is the actual body frame acceleration, g is the acceleration of gravity, and $R^B_I$ is a rotation matrix from an inertial frame to a body frame of the sensor 102.

Step S3 of determining based on the generated usage data a characteristic indicative of the usage of the item comprises: estimating S3a a gravity vector in the multi-dimensional coordinate system based on the generated usage data; and computing S3b an acceleration vector of the item in the multidimensional coordinate system based on the generated usage data and the estimated gravity vector. On a horizontal surface, a sensor 102 senses the acceleration of an object which can be integrated into the linear speed. However, for movements in a 3D space, the sensed acceleration includes influences of gravity. This has to be compensated in order to get the actual speed. Following on the example where it is assumed that the sensor 102 of the apparatus 101 is an accelerometer, compensation is performed by the processing unit 103 and/or 203. The processing unit 103 or 203 removes the normal force component from the acceleration measurement. Solving (1) for the body frame acceleration results in:

$$a_B = a_m + R_I^B \begin{pmatrix} 0 \\ 0 \\ g \end{pmatrix} \quad (2)$$

The body-frame acceleration $a_B$ must then be rotated into the inertial frame so that it can be integrated to obtain velocity and position. This yields:

$$a_I = R_B^I a_m + \begin{pmatrix} 0 \\ 0 \\ g \end{pmatrix} \quad (3)$$

Equation (3) may be used directly to measure the inertial frame acceleration of the sensor 102.

Step S3 of determining based on the generated usage data a characteristic indicative of the usage of the item comprises further: computing S3c a velocity vector of the item in the multi-dimensional coordinate system based on the computed acceleration vector; determining S3d a position vector of the item in the multi-dimensional coordinate system based on the computed velocity vector; and/or determining S3e an orientation vector of the item in the multidimensional coordinate system based on the computed velocity vector and the estimated gravity vector.

In one or more embodiments, the characteristic indicative of the usage of the item comprises the estimated gravity vector, the computed acceleration vector, the computed velocity vector, the determined position vector, and/or the determined orientation vector. Once the measured inertial-frame acceleration $a_I$ is obtained, the processing unit 103, 203 can integrate it to obtain inertial frame velocity $v_I$ and position $p_I$:

$$v_I = \int a_I \quad (4)$$

$$p_I = \iint a_I \quad (5)$$

Usage data is obtained at discrete time intervals so the computed velocity and position may be computed in the following form:

$$v_I[k+1] = v_I[k] + T\, a_I[k] \quad (6)$$

$$p_I[k+1] = p_I[k] + T\, v_I[k] \quad (7)$$

where T is the sampling period of the sensor 102.

In an illustrative example of where the proposed technique is applicable, the sensor 102 of the apparatus 101 is an accelerometer. The sensor 102 continuously measures the forces exercised on item 210 during usage. Once a detection threshold is reached, an interrupt is raised by the sensor 102 to the processing unit 103. A detection threshold may be that a force in a predefined direction is measured, or that a set of forces representative of acceleration is measured. The processing unit 103 is then woken up from power down mode. The usage data is passed to the processing unit 103 where the usage data is processed. The forces measured and determined in the coordinate system 211, 311 in x, y, z directions and their uncertainty ranges are inputs to processing unit 103. The processing unit 103 first estimates the gravity vector and performs a compensation for normal forces to obtain the acceleration. The processing unit 103 then computes the speed vector and the relative position by first order and second order integration of the gravity vector compensated values. Further security algorithm and compressions are then performed by the processing unit 103 depending on the initial configuration. Finally, the derived characteristic comprising the computed acceleration, the derived speed and the determined positions is transferred to the wireless communication unit 104. The processing unit may trigger to power on only the baseband hardware and the transmission path in the radio chip of the wireless communication unit 104 or to power on the entire wireless communication unit 104. The wireless communication unit 104 sends the derived characteristic and usage data to the collector system 203. The derived characteristic and usage data from apparatus 101 is received by the collector system 201 via interface 202. The derived characteristic and usage data is then passed to the collector processing unit 203. The collector processing unit 203 processes the data received to derive a further feature such as a geographical trace path of the item 210, a positioning of the item 210, a speed of the item 210 during an activity, and/or an observation model of the item 210. After extracting the further feature, the processing unit 203 stores the further feature and received data in the data storage unit 204. The data storage unit 204 provides access to usage data and its derivatives to potential users, e.g. users 301 and 302.

According to some aspects, step S3 of determining based on the generated usage data a characteristic indicative of the usage of the item comprises correlating S3f the measured environmental parameters with the estimated gravity vector, the computed acceleration vector, the computed velocity vector, the determined position vector, and/or the determined orientation vector. Step S3 comprises determining S3g the characteristic indicative of the usage of the item based on the correlating.

In one or more embodiments, step S3 of determining, based on the generated first and second usage data, a characteristic indicative of the usage of the item, comprises obtaining S3h a time stamp, and generating S3g a spatiotemporal map of the measured environmental parameters at the determined position vector, the estimated gravity vector, the computed acceleration vector, the computed velocity vector, and/or the determined orientation vector. Obtaining S3h a timestamp may comprise obtaining a timestamp of the measured parameter, such as an indicator of the time when the parameter is measured.

In one or more embodiments, the apparatus 101 uses usage data derived from measurements performed by two or more sensors, such as a plurality of sensors, attached to a user, and/or placed on objects, and/or placed in a room. At least a subset of sensors 102a may comprise environmental sensors to measure light parameter, sound parameter, and/or temperature. Another subset of sensors 102 may comprise motion sensors. An additional subset of sensors may be dedicated to measuring physiological parameters. The apparatus 101 may combine according to the proposed technique the physiological parameters and the environmental parameters to determine a characteristic of the usage of an item or a characteristic of the activity of the user of the item.

In an illustrative example where the present technique is applicable, a sleep quality is evaluated by the disclosed apparatus using measurements on movement performed by a motion sensor, sound and light condition measured by one or more environmental sensors comprised in the disclosed apparatus. Measuring the amount of sleep and assessing the quality of sleep of a user with a special condition or following a treatment is in many situations critical. The apparatus 101 monitors or detects sleep using usage data derived from measurements performed by two or more sensors, such as a plurality of sensors, attached to a user, and/or placed on objects, and/or placed in a room. At least a subset of sensors 102a comprises environmental sensors to measure light parameter, sound parameter, and/or temperature. Another subset of sensors 102 comprises motion sensors. An additional subset of sensors is dedicated to measuring physiological parameters. The apparatus 101 combines according to the proposed technique the physiological parameters and the environmental parameters to determine a characteristic indicative of sleep, such as a sleep-related metric. The apparatus 101 improves accuracy of an activity monitoring compared to e.g. monitoring based on movement only. For example, the apparatus 101 additionally using environmental sensors such as for measuring light and/or sound condition improves accuracy in analysing e.g. a light sensitivity of a user. The apparatus 101 additionally using physio-sensors improves accuracy in analysing e.g. a breathing rhythm of a user. A collector system 201 receiving usage data and/or a characteristic correlates environmental measurements as well as health monitoring data with the corresponding activity related to one or more activities performed by the user. This allows optimizing recommendations and/or guidance on medication, and/or adjustment of environmental condition.

The method 400 for monitoring a usage of an item further comprises triggering S5 an operation based on the generated usage data and/or the determined characteristic indicative of the usage of the item. The data related to usage stored in the data storage unit 204 can also be taken into account to trigger an action selected amongst a set of predefined actions and to be performed on the item or on another item.

It is envisaged that step S3 of the method 400 may be performed exclusively or additionally, entirely or partially by the collector system 201 for monitoring a usage of item.

According to one or more embodiments, the disclosure relates to an apparatus 101 for monitoring a usage of an item comprising a processing unit 103 and a data storage 105, said data storage containing instructions executable by said processing unit 103 to execute the method 400.

In one or more embodiments, the collector system is configured to receive usage data and/or a characteristic and generate a 3 dimensional feature such as a 3D animation of items and/or of body parts. The 3 dimensional feature may be augmented with environmental parameters provided by the apparatus, e.g. light, temperature, and/or physiological parameter. The collector system 201 may enable a remote monitoring of a user, such as a user with special needs. The apparatus 101 may detect a specific movement or activities (e.g. fall or eating) that the collector system 201 analyses remotely. The collector system 201 may output a visualization of the activity monitored enhanced with environmental conditions as well as physiological data. The collector system 201 may output the visualization to a team of expert that may then identify a cause of a specific behaviour (e.g. violent reaction, high heart beat rate).

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

The invention claimed is:

1. An apparatus for monitoring an activity involving a usage of an item, the usage characterising a physical handling of the item, the apparatus comprising:
a first sensor configured to measure a first parameter related to a first condition affected by the usage of the item and to generate first usage data based on the measured first parameter;
a second sensor configured to measure a second parameter related to a second condition and to generate second usage data based on the measured second parameter, wherein the generated second usage data comprises a sequence of environmental parameters, and/or a sequence of physiological parameters;
a processing unit configured to determine based on the generated first and/or second usage data a characteristic indicative of the usage of the item by:
obtaining a time stamp; and
generating a spatio-temporal map of the measured environmental parameters based on at least one of a determined position vector, an estimated gravity vector, a computed acceleration vector, a computed velocity vector, and a determined orientation vector; and
a wireless communication unit configured to transmit the determined characteristic indicative of the usage of the item and/or the generated first and/or second usage data.

2. The apparatus according to claim 1, wherein the first sensor and/or the second sensor comprises a sensor configured to measure a movement and/or a series of movements; and/or a sensor configured to measure a position and/or an orientation; and/or a sensor configured to measure a location and/or a path; and/or an accelerometer; and/or a gyroscope; and/or a transducer; and/or a sensor configured to measure light parameters; and/or a sensor configured to measure temperature; and/or a sensor configured to measure pressure; and/or a sensor configured to measure a sound ; and/or a sensor configured to measure a physiological property of a user.

3. The apparatus according to claim 1, wherein the processing unit and the wireless communication unit are integrated in a wireless modem.

4. The apparatus according to claim 1, wherein the wire-less communication unit is configured to operate in a cellular system.

5. The apparatus according to claim 1, wherein the first usage data and/or the second usage data comprises a sequence of positions of the item, a sequence of geographic locations of the item, a sequence of orientations of the item, a force, a velocity of the item, and/or an acceleration of the item, a sequence of light parameter measurements, a sequence of temperature measurements, a sequence of pressure measurements, a sequence of sound measurements.

6. The apparatus according to claim 1, wherein the processing unit is configured to be activated by a signal received from the sensor; and/or wherein the wire-less communication unit is configured to be activated by a signal received from the processing unit.

7. The apparatus according to claim 1, further comprising a controller configured to trigger an operation based on the generated first and/or second usage data and/or the determined characteristic indicative of the usage of the item.

8. A collector system for monitoring an activity involving a usage of an item, the usage characterising a physical handling of the item, the collector system comprising:
an interface configured to receive usage data and/or a characteristic indicative of the usage of the item, wherein the received usage data comprises a sequence of environmental parameters, and/or a sequence of physiological parameters,
a collector processing unit configured to determine based on the received usage data and/or the received characteristic a feature indicative of the usage of the item by:
obtaining a time stamp; and
generating a spatio-temporal map of the measured environmental parameters based on at least one of a determined position vector, an estimated gravity vector, a computed acceleration vector, a computed velocity vector, and a determined orientation vector; and a data storage unit configured to store the determined feature, the received usage data and the received characteristic;

wherein the feature indicative of the usage of the item comprises a score of an evaluation test performed by a user; and the collector processing unit is configured to determine a correlation between the score and the received usage data and/or the received characteristic.

9. A collector system according to claim 8, wherein the interface is configured to receive usage data and/or characteristics from a plurality of items involved in one or more activities and/or from a plurality of users.

10. A collector system according to claim 8, wherein the collector processing unit is configured to determine a correlation between the feature indicative of the usage of the item and the received usage data and/or the received characteristic related to one or more activities performed by the user.

11. A collector system according to claim 8, wherein the collector processing unit is configured to identify a user, to identify the activity performed by the user, and to determine a correlation between the activity and the determined feature and/or a user capability.

12. A system for monitoring a usage of an item, the usage characterising a handling of the item, the system comprising an apparatus with:
- a first sensor configured to measure a first parameter related to a first condition affected by the usage of the item and to generate first usage data based on the measured first parameter;
- a second sensor configured to measure a second parameter related to a second condition and to generate second usage data based on the measured second parameter, wherein the generated second usage data comprises a sequence of environmental parameters, and/or a sequence of physiological parameters;
- a processing unit configured to determine based on the generated first and/or second usage data a characteristic indicative of the usage of the item;
- a wireless communication unit configured to transmit the determined characteristic indicative of the usage of the item and/or the generated first and/or second usage data by:
  obtaining a time stamp; and
  generating a spatio-temporal map of the measured environmental parameters based on at least one of a determined position vector, an estimated gravity vector, a computed acceleration vector, a computed velocity vector, and a determined orientation vector; and
- a collector system according to claim 8;
wherein the apparatus is configured to transmit the determined characteristic indicative of the usage of the item and/or the generated usage data to the collector system.

13. A method for monitoring an activity involving a usage of an item, the usage characterising a physical handling of the item, the method comprising:

measuring (S1) a first parameter related to a first condition affected by the usage of the item and a second parameter related to a second condition;

generating (S2) first usage data based on the measured first parameter and second usage data based on the measured second parameter, wherein the second usage data comprises a sequence of physiological parameters;

determining (S3) based on the generated first and/or second usage data a characteristic indicative of the usage of the item by:
  obtaining a time stamp; and
  generating a spatio-temporal map of the measured environmental parameters based on at least one of a determined position vector, an estimated gravity vector, a computed acceleration vector, a computed velocity vector, and a determined orientation vector; and transmitting (S4) the determined characteristic indicative of the usage of the item and/or the generated first and/or second usage data on a wireless communication channel.

14. A method according to claim 13, wherein measuring (S1) a first parameter related to a first condition affected by the usage of the item comprises measuring (S1a) a position of the item, a movement of the item and/or a series of movements, and/or a force corresponding to the movement of the item, and/or a location of the item and/or a path of the item; and/or
  wherein measuring (S1) a second parameter related to a second condition comprises measuring (S1b) one or more environmental parameters.

15. A method according to claim 13, wherein determining (S3) based on the generated first and second usage data a characteristic indicative of the usage of the item comprises:
  estimating (S3a) a gravity vector in the multi-dimensional coordinate system based on the generated usage data;
  computing (S3b) an acceleration vector of the item in the multi-dimensional coordinate system based on the generated usage data and the estimated gravity vector;
  computing (S3c) a velocity vector of the item in the multi-dimensional coordinate system based on the computed acceleration vector; and/or
  determining (S3d) a position vector of the item in the multi-dimensional coordinate system based on the computed velocity vector; and/or
  determining (S3e) an orientation vector of the item in the multi-dimensional coordinate system based on the computed velocity vector,
  correlating (S3f) the measured environmental parameters with the estimated gravity vector, the computed acceleration vector, the computed velocity vector, the determined position vector, and/or the determined orientation vector; and
  determining (S3g) the characteristic indicative of the usage of the item based on the correlating.

16. An integrated-circuit card configured to perform the method of claim 13.

17. A computer program, comprising computer readable code which, when run on a processing unit causes the apparatus to perform the method as claimed in claim 13.

* * * * *